US012613945B2

(12) United States Patent
Ambrosetti

(10) Patent No.: US 12,613,945 B2
(45) Date of Patent: Apr. 28, 2026

(54) USER AUTHENTICATION BY MEANS OF VEHICLE-SPECIFIC DATA

(71) Applicant: AUDI AG, Ingolstadt (DE)

(72) Inventor: Sebastien Ambrosetti, Waidhofen (DE)

(73) Assignee: AUDI AG, Ingolstadt (DE)

( * ) Notice: Subject to any disclaimer, the term of this patent is extended or adjusted under 35 U.S.C. 154(b) by 87 days.

(21) Appl. No.: 18/291,348

(22) PCT Filed: Jun. 15, 2022

(86) PCT No.: PCT/EP2022/066360
§ 371 (c)(1),
(2) Date: Jan. 23, 2024

(87) PCT Pub. No.: WO2023/041210
PCT Pub. Date: Mar. 23, 2023

(65) Prior Publication Data
US 2025/0124116 A1      Apr. 17, 2025

(30) Foreign Application Priority Data

Sep. 16, 2021    (DE) .......................... 102021123970.2

(51) Int. Cl.
*G06F 21/31*              (2013.01)
(52) U.S. Cl.
CPC .................................... *G06F 21/31* (2013.01)
(58) Field of Classification Search
CPC ....... G06F 21/31; G06F 21/35; H04L 2209/84
See application file for complete search history.

(56) References Cited

U.S. PATENT DOCUMENTS

| | | | |
|---|---|---|---|
| 2019/0147672 A1 | 5/2019 | Zwink et al. | |
| 2019/0228328 A1 | 7/2019 | Ohazulike et al. | |
| 2019/0385269 A1* | 12/2019 | Zachary | ................... H04N 7/18 |
| 2020/0073864 A1 | 3/2020 | Jo | |
| 2020/0313890 A1* | 10/2020 | Mondello | ............. H04L 9/3239 |
| 2021/0294342 A1* | 9/2021 | Marasigan | ....... G08G 1/096791 |
| 2021/0312031 A1 | 10/2021 | McFarland, Jr. | |
| 2022/0024423 A1* | 1/2022 | McFarland, Jr. | ...... G07C 5/008 |

FOREIGN PATENT DOCUMENTS

| | | |
|---|---|---|
| CN | 110155079 A | 8/2019 |
| DE | 102017219533 A1 | 5/2019 |
| DE | 102018200497 A1 | 7/2019 |
| DE | 102019113185 A1 | 12/2019 |
| DE | 112018007016 T5 | 11/2020 |

OTHER PUBLICATIONS

International Search Report and Written Opinion issued on Oct. 13, 2022, in corresponding International Application No. PCT/EP2022/066360, 36 pages.
International Preliminary Report on Patentability issued on Dec. 13, 2023, in corresponding International Application No. PCT/EP2022/066360, 15 pages.
Examination Report issued on Feb. 24, 2022, in corresponding German Application No. 102021123970.2, 12 pages.
Tsaur et al., "DANS: A Secure and Efficient Driver-Abnormal Notification Scheme With IoT Devices Over IoV", IEEE Systems Journal, vol. 13, No. 2, Jun. 2019, pp. 1628-1639.

* cited by examiner

*Primary Examiner* — Gil H. Lee
(74) *Attorney, Agent, or Firm* — Maier & Maier, PLLC

(57)          ABSTRACT

A method for authenticating a user of a vehicle. A backend server authenticates a user of a vehicle by personal data provided by the user, a backend server for authenticating a user of a vehicle and a vehicle for authenticating a user of the vehicle.

14 Claims, 5 Drawing Sheets

USER AUTHENTICATION BY MEANS OF VEHICLE-SPECIFIC DATA

FIELD

The invention relates to a method for authenticating a user of a vehicle, wherein a backend server authenticates a user of a vehicle using personal data provided by the user. The invention further relates to a backend server for authenticating a user of a vehicle as well as a vehicle for authenticating a user of the vehicle.

BACKGROUND

Methods for authenticating a user are part of the state of the art in various configurations and serve to determine the authenticity of a user, for example when admitting the user to a closed, i.e., non-public, and in particular fee-based area of an online service or to secure a cashless service transaction of a user such as an online payment.

In this way, authentication procedures create trust between users who are involved in an online event and are generally spaced apart and mutually unknown, and replace conventional types of trust building, which usually require at least one personal presence of the users involved at predetermined locations, wherein the personal presence can take place simultaneously in the same place or sequentially in different places.

Naturally, every authentication of a user is based on information that identifies the user with certainty or at least with a high probability bordering on certainty, i.e., unmistakably, and is known exclusively to the user and/or can only be provided by the user. Examples of such information include login credentials, i.e., a username and password combination, or biometric data such as fingerprints.

It goes without saying that the more information of different types, also referred to as authentication factors, is involved in the process, the safer the authentication. For many purposes, so-called two-factor authentication is sufficient and also practical, wherein the user is identified using both access data and biometric data.

In the context of authentication methods, high security specifically means extensive protection against misuse of someone else's identity by an actually unauthorized user. This extensive protection is usually achieved by the exclusivity of the information used for authentication.

However, protection depends on the one hand on the discipline of the authorized user dealing with the exclusive information and, on the other hand, on the risk that an unauthorized user could maliciously obtain the exclusive information. However, it is up to the authorized user to minimize said risk by a behavior or use of end devices that are sufficiently protected against misuse.

Strong protection that is independent of each user can be achieved by a blockchain that is usually stored decentralized on a number of computers. The blockchain comprises a plurality of blocks. Each block comprises a hash value, a hash value of a previous block and information stored in the block. The blocks thus create a distributed and singly linked list, which is virtually impossible to manipulate without going unnoticed and thus securely protects the information stored therein.

The use of a blockchain to secure vehicle-related data is already known.

DE 10 2019 113 185 A1 discloses a method wherein a vehicle provides image data captured by an optical sensor with vehicle-related data as a watermark. The watermark is a hash of a block-chain stored on backend servers and allows the captured image data to be clearly allocated to the vehicle.

For another purpose, CN 110 155 079 A discloses a driving assistance system for autonomous driving of a vehicle, which is configured to collect environmental data, position data, and operating status data of the vehicle and to store them as traffic data in a blockchain distributed over a plurality of vehicles and comprising traffic data of a plurality of vehicles. Furthermore, the driving assistance system is configured to read traffic data from the blockchain and to control the vehicle autonomously, i.e., without the involvement of an occupant of the vehicle, depending on the traffic data read.

Insurance companies in particular can benefit from the process described in US 2020/0073864 A1, wherein vehicle-related data is stored event-controlled by backend servers in a blockchain. The blockchain secures vehicle-related data from improper changes and ideally allows vehicle accidents to be reconstructed objectively.

However, the authentication methods presented herein are often impractical while a vehicle is driving, since they usually require the concentrated attention of a user, usually a driver, of the vehicle for a fairly long period of time. For example, the user may be distracted by a traffic situation in the vehicle due to the authentication method. In addition, a conventional two-factor authentication of the user at an infrastructure device, i.e., stationary equipment intended for vehicles such as a toll booth, a paid parking lot, a gas station or charging station, may be unsuitable or impossible or may hinder other vehicles waiting at the same infrastructure device.

Apart from this, it would be desirable to guarantee a level of security for authenticating the user of a vehicle that significantly exceeds the security of conventional two-factor authentication.

SUMMARY

It is therefore an object of the invention to propose a method for authenticating a user of a vehicle which ensures a particularly high level of security for authenticating the user and can be easily carried out while the vehicle is in motion. Further objects of the invention are to provide a backend server for authenticating a user of a vehicle and a vehicle for authenticating a user of the vehicle.

A subject matter of the invention is a method for authenticating a user of a vehicle, wherein a backend server authenticates a user of a vehicle using personal data provided by the user. The starting point of the invention is a conventional one-factor authentication method that authenticates the user of the vehicle. However, the one-factor authentication method ensures inadequate authentication security for many applications or is too impractical or too complicated to carry out in an application situation while the vehicle is driving.

In the method according to the invention, the backend server authenticates the user by means of vehicle-related data provided and transmitted by the vehicle or by means of equipment-related data provided and transmitted by stationary equipment. The method according to the invention is based on a two-factor authentication of the user, meaning that the security of the authentication is already increased, as is the case with known two-factor authentications. As a second authentication factor, the method uses data provided by the user's vehicle or stationary equipment. The vehicle-related data may be of a static nature and may identify the vehicle itself. However, the vehicle-related data may also be of a dynamic nature and be generated by using the vehicle, i.e., by driving, and correspond to the use of the vehicle.

In other words, vehicle-related data can produce a vehicle profile that has a high degree of uniqueness or distinctiveness. As a result, the vehicle-related data significantly increases the security of the user's authentication.

Apart from this, the vehicle can provide the vehicle-related data at any time directly and without the active involvement of the user. Accordingly, the vehicle-related data is an extremely practical second authentication factor, which is available in any application situation without requiring the user's attention and without distracting the user from the vehicle's traffic situation. The authentication method therefore offers a particularly high level of security both in terms of the authentication itself and with regard to the vehicle in the traffic situation.

Preferably, the backend server authenticates the user by means of vehicle identifiers, vehicle coordinates and/or driving behavior data of the vehicle as the vehicle-related data and/or by means of access data, biometric data, or device usage data of the user as the personal data. The vehicle identifiers can include a vehicle registration number, a vehicle identification number (VIN) or an IP address permanently assigned to the vehicle. The vehicle coordinates can include a vehicle position, for example geocoordinates of the vehicle recorded by a GPS receiver of the vehicle, or a route of the vehicle, i.e., a starting point, a route or a destination point. The driving behavior data may include steering hysteresis, pedal hysteresis, driving style or a time stamp generated by the vehicle.

The access data may comprise or consist of a combination of a username and a password. Biometric data may include a user's fingerprint, seat adjustment, voice, appearance, or temperature. The biometric data can be collected using an internal sensor such as a touchpad, a microphone, an internal camera, or a thermometer in the vehicle. Device usage data may include usage data from the user's mobile devices such as smartphones or tablets.

The equipment-related data may include a stationary equipment installation identifier, a stationary equipment location or a timestamp provided by the stationary equipment.

The personal data, vehicle-related data and equipment-related data listed above are merely examples and not exhaustive. Further data may also be transmitted from the vehicle to the backend server. The data transmitted to the backend server produces a usage history, i.e., a usage profile, of the vehicle that is typical for the user.

Due to the large number and variety of data transmitted from the vehicle to the backend server, there is a high degree of redundancy within the usage history and a large number of typical usage patterns of the vehicle for the user, for example frequent vehicle positions, in particular parking positions, frequent driving routes, frequently visited contact points, for example parking lots or parking garages, frequent usage periods, for example early morning and late afternoon, and the like.

In particular, the vehicle can transmit the personal data and the vehicle-related data to the backend server on an event-driven basis immediately or with a time delay after local buffering. The vehicle automatically transmits the data immediately when it is wirelessly connected to a mobile network (LTE, 4G, 5G, etc.), to a WiFi access point, to a Bluetooth-enabled device or to a V2X (Vehicle-To-Everything) partner. If the vehicle is not connected wirelessly, the vehicle temporarily stores the data in a storage device of the vehicle and automatically transmits the stored data when it is connected wirelessly again.

Advantageously, the vehicle transmits the personal data and the vehicle-related data to the backend server in encrypted and/or compressed form. Encrypting the transmitted data further increases the security of the method. The data can be encrypted, i.e., signed, using personal data. Compressing the data conserves spectral resources of the vehicle and/or the mobile network.

In a preferred embodiment, the backend server forms a block of a blockchain assigned to the user and the vehicle from the transmitted personal data and the transmitted vehicle-related data as well as a timestamp. The blockchain stores the transmitted data permanently and protects the stored data from unauthorized manipulation.

Ideally, the created block corresponds to a contact of the vehicle with a contact point of the vehicle detected by the vehicle. The vehicle contact generates an event that triggers the transmission of data. The blockchain is thus created automatically and casually by driving the vehicle, i.e., without the involvement of an occupant of the vehicle. Due to the high data complexity of a vehicle journey, the created blockchain is also practically impossible to reproduce, which offers particularly strong protection against improper manipulation.

It is noted that the blockchain is also very energy-efficient. The data stored in the blockchain is generated solely by driving anyway, i.e., by using the vehicle as a result of a mobility requirement. In contrast to traditional methods, in which the data stored in the blockchain is generated and provided by a large number of computers with high energy input, no dedicated energy input is required to provide the data stored in the blockchain.

In favorable embodiments, stationary equipment or another vehicle are detected as the contact point. Stationary equipment can include a traffic light, a traffic sign, a barrier of a parking garage or parking lot, a toll station, a gas station, a charging station, a building, a residential building, and the like.

The backend server advantageously verifies the created block by comparing the created block with a plurality of stored predetermined contact points or with a block of a blockchain of another vehicle. By comparing the data, the backend server checks the consistency of the transmitted data across vehicles. For example, if two vehicles transmit reciprocal contacts with essentially the same time stamp, the two vehicles confirm each other. The same applies mutatis mutandis to contact between a vehicle and stationary equipment.

In other embodiments, the user authorizes or prohibits the transmission of the personal data or the vehicle-related data or the creation of the block. The user can generally authorize and exceptionally prohibit or generally prohibit and exceptionally authorize the transmission of data or the creation of the block for a trip of the vehicle.

In these embodiments, the vehicle can be a contact point for other vehicles if the user prohibits the transmission of the personal data or the vehicle-related data or the creation of the block. The prohibition does not preclude the vehicle from passively participating in the process.

In an advantageous embodiment, the authentication of the user comprises a plausibility check of the transmitted personal data and/or vehicle-related data by means of an artificial neural network. After a training phase, the artificial neural network recognizes patterns in the personal data and/or the vehicle-related data with a low probability of error, such as frequent positions or frequent routes of the vehicle or stationary equipment often frequented by the vehicle.

Another subject-matter of the invention is a backend server. The backend server is configured to receive an authentication request from a service provider regarding a user, to authenticate the user and to transmit an authentication result to the service provider.

The backend server according to the invention is further configured to execute a method according to the invention for authenticating a user of a vehicle together with a vehicle according to the invention. To authenticate the user of the vehicle, the backend server uses personal data transmitted by the vehicle and vehicle-related data, and, in particular, equipment-related data. In this way, the backend server ensures particularly secure authentication of the user and allows particularly simple authentication of the user.

Another subject-matter of the invention is a vehicle. The vehicle is configured to be driven by a user of the vehicle.

The vehicle according to the invention is further configured to execute a method according to the invention for authenticating the user of the vehicle together with a backend server according to the invention. The vehicle automatically transmits personal data and vehicle-related data to the backend server to authenticate the user of the vehicle. In this way, the vehicle ensures particularly simple authentication of the user and allows the backend server a particularly safe authentication of the user.

A significant advantage of the method according to the invention is that it provides a particularly secure and particularly simple two-factor authentication of a user of a vehicle. The special security of authentication is not only available when the vehicle is in motion. Rather, the user can be authenticated particularly securely in any situation by means of data previously transmitted by the vehicle, i.e., by means of a usage history of the vehicle.

The method according to the invention thus supplements or replaces known user authentication methods such as conventional two-factor authentication or even personal authentication by a notary. In particular, the process offers a vehicle manufacturer the opportunity to develop new business areas as a provider of authentication services and, for example, to cooperate with payment service providers such as Paypal, Amazon Pay or Apple Pay.

BRIEF DESCRIPTION OF THE FIGURES

The invention is schematically illustrated in the drawing with the aid of an embodiment and is described further with reference to the drawing. In the figures.

DETAILED DESCRIPTION

Figure 1:
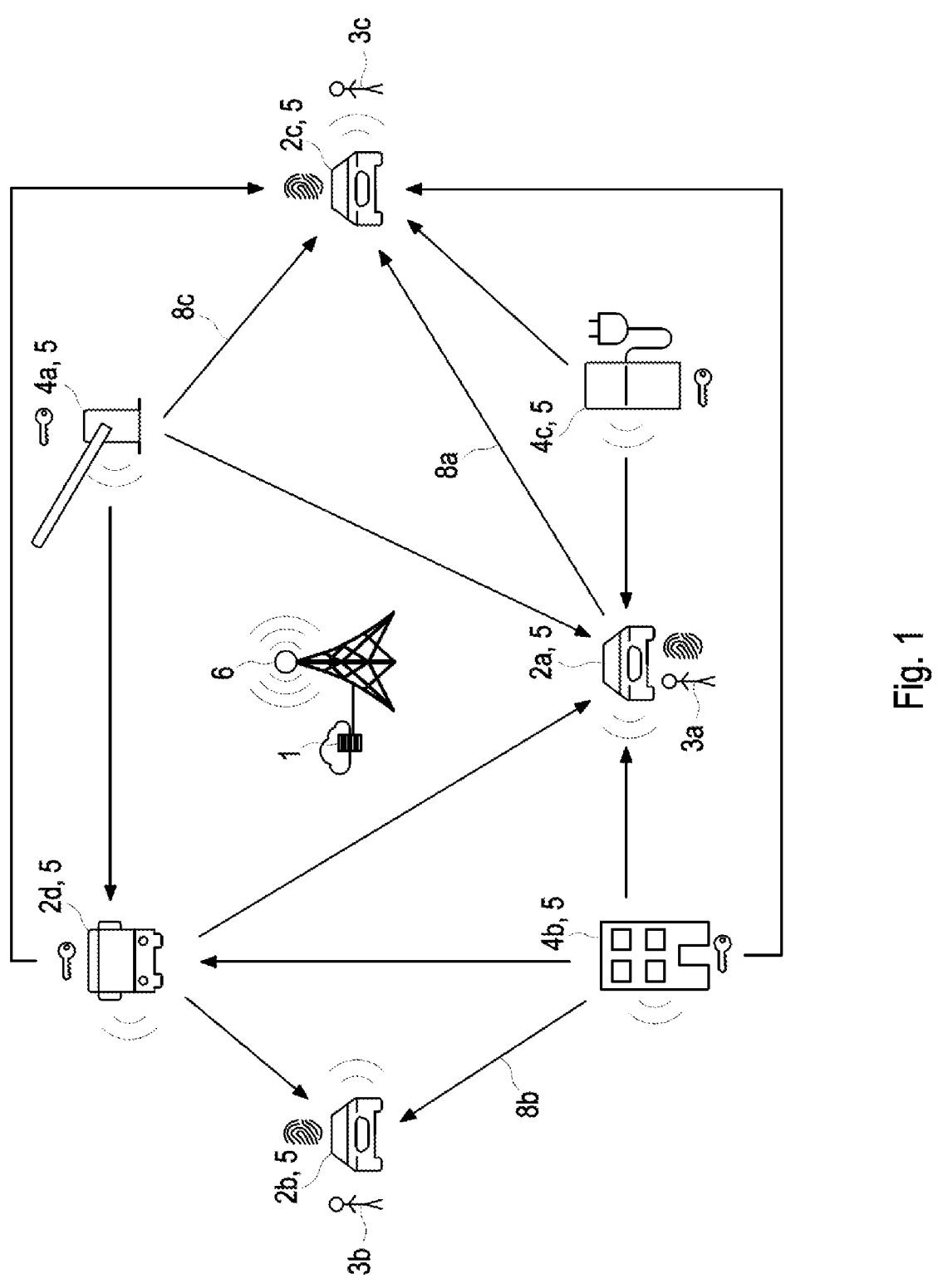
FIG. 1 shows a system with three vehicles and a backend server each according to an embodiment of the invention and a plurality of contact points of the vehicles.

FIG. 1 shows a system with three vehicles 2a, 2b, 2c and a backend server 1 each according to an embodiment of the invention and a plurality of contact points 5 of the vehicles 2a, 2b, 2c; The backend server 1 is connected to a mobile radio network 6 and is accessible via the mobile radio network 6 for the vehicles 2a, 2b, 2c and a further vehicle 2d in the form of a means of local public transport, specifically a bus, and stationary equipment 4a, 4b, 4c, in short infrastructure devices, in the form of a barrier 4a of a parking garage or paid parking lot, a building 4b and a charging station 4c. The vehicles 2a, 2b, 2c are each used by users 3a, 3b, 3c.

The contact points 5 of a vehicle 2a, 2b, 2c include the remaining vehicles 2a, 2b, 2c as well as the other vehicle 2d and the stationary equipment.

It is understood that the contact points 5 shown are merely examples and that the invention is not limited to the contact points 5 shown, either in terms of number or type. The invention is therefore readily applicable to a smaller number of contact points or a larger number of contact points or to contact points of a different type.

The vehicles 2a, 2b, 2c, 2d can each come into contact with another vehicle 2a, 2b, 2c, 2d or with stationary equipment 4a, 4b, 4c as a contact point 5, i.e., come closer to the respective contact point 5 than a predetermined minimum distance. Such contacts are symbolized in FIG. 1 as arrows, of which exemplary contacts 8a, 8b, 8c of the vehicles 2a, 2b, 2c are provided with a reference numeral.

Figure 2:
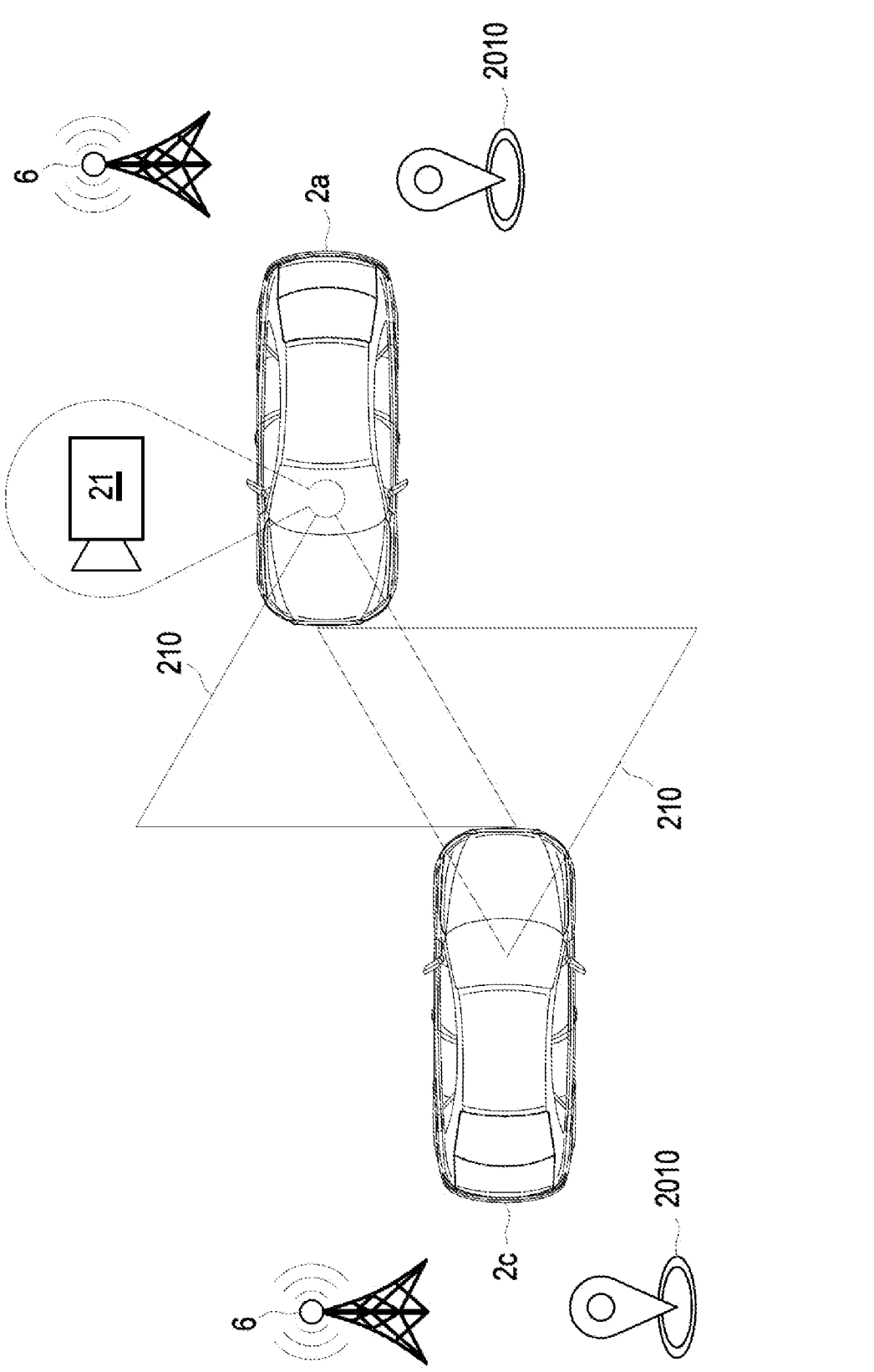
FIG. 2 shows a detail of the system shown in FIG. 1.

FIG. 2 shows a detail of the system shown in FIG. 1. The detail includes the contact 8a of the vehicle 2a with the vehicle 2c. The vehicle 2a and the vehicle 2b are each wirelessly connected to the mobile radio network 6 and are located at respective vehicle positions 2010, for example those recorded by GPS receivers.

The vehicle 2a comprises an environment sensor 21, for example in the form of an outdoor camera or a radar sensor with a detection area 210 for detecting objects in an environment of the vehicle 2a. The vehicle 2b is also adapted to detect objects in an environment of the vehicle 2b by sensors if they are arranged in a detection area 210.

If a distance between the respective vehicle positions 2010 detected by the vehicles 2a, 2c reaches or falls below a predetermined minimum distance and the respective other vehicles 2c, 2a are detected by sensors, i.e., are arranged in the respective detection areas 210 of the vehicles 2c, 2a, the contact 8a of the vehicles 2a, 2c can be detected and an event corresponding to the contact can be generated, which can be used for event control.

Figure 3:
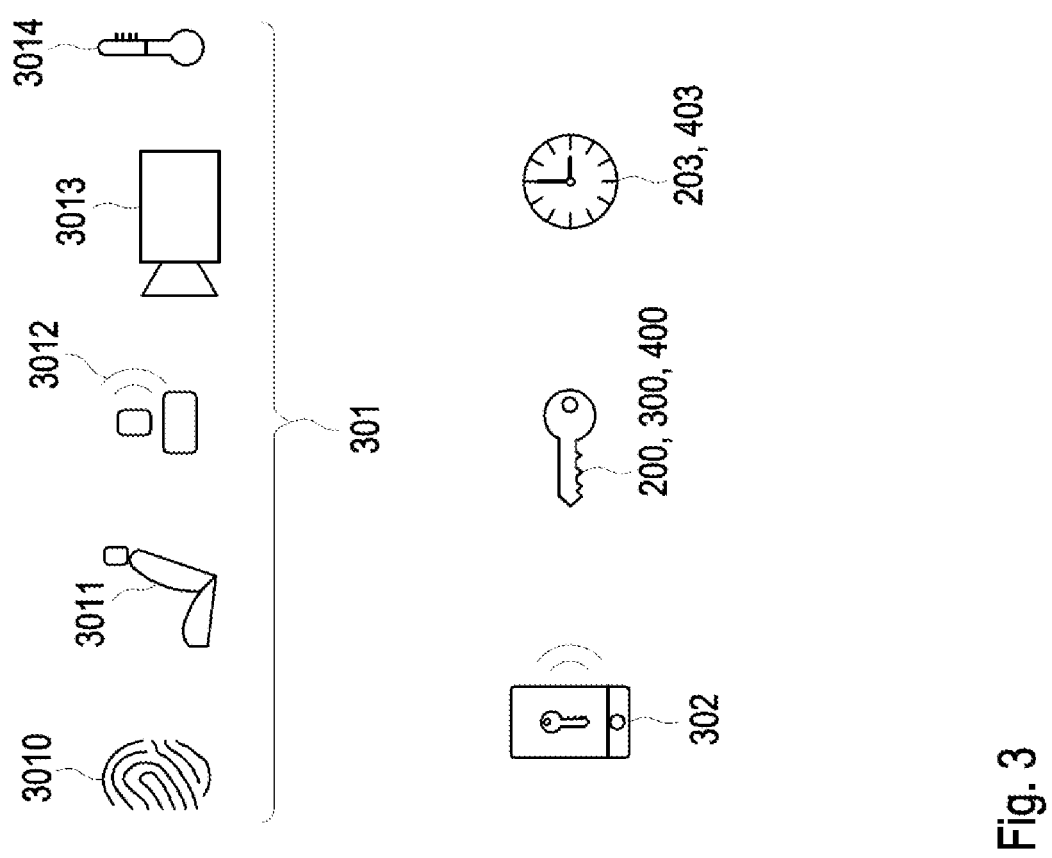
FIG. 3 shows a plurality of personal data, vehicle-related data, and equipment-related data.
Figure 3:
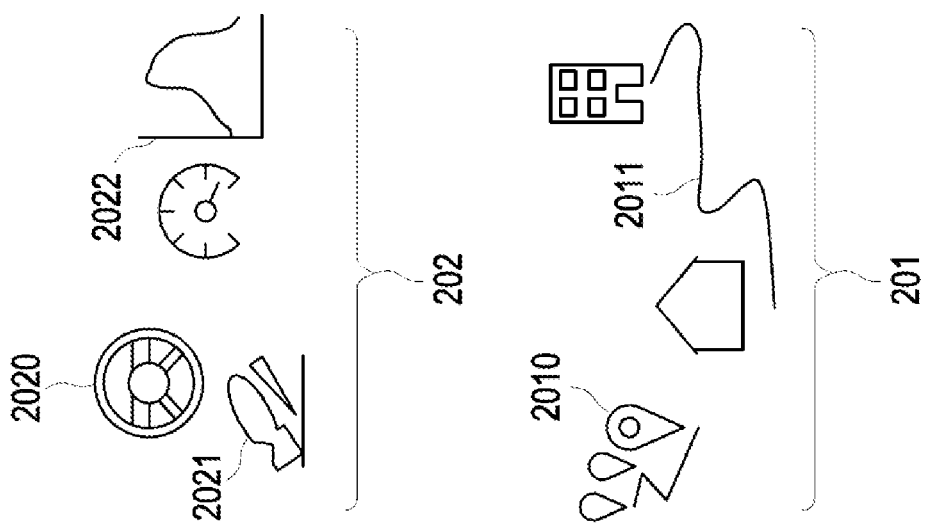

FIG. 3 shows a plurality of personal data 30, vehicle-related data 20 and equipment-related data 40. The personal data 30 includes access data 300, i.e., username and password combinations, biometric data 301, for example a fingerprint 3010, a seat setting 3011, a voice 3012 or an appearance 3013. The personal data 30 includes access data 300, i.e., combinations of username and password, biometric data 301, for example a fingerprint 3010, a seat setting 3011, a voice 3012 or an appearance 3013, which can be captured by means of a corresponding interior sensor of a vehicle 2a, 2b, 2c, as well as device usage data 302 of a user 3a, 3b, 3c of the vehicle 2a, 2b, 2c, which can relate to the use of a mobile terminal device such as a smartphone or a tablet of the user 3a, 3b, 3c.

The vehicle-related data 20 includes vehicle identifiers 200, vehicle coordinates 201 such as a vehicle position 2010 or a driving route 2011 of the vehicle 2a, 2b, 2c, driving behavior data 202 such as a steering hysteresis 2020, a pedal hysteresis 2021 or a driving style 2022 and timestamps 203.

The equipment-related data 40 include equipment identifiers 400 and timestamps 403.

The backend server 1 and the vehicles 2a, 2b, 2c are each configured for authenticating a user 3a, 3b, 3c of a vehicle 2a, 2b, 2c, together with a vehicle 2a, 2b, 2c and the backend server 1, respectively, to execute a method described below in accordance with an embodiment of the invention.

The backend server 1 authenticates the users 3a, 3b, 3c of the vehicles 2a, 2b, 2c by means of personal data 30 provided by the users 3a, 3b, 3c. The vehicles 2a, 2b, 2c can transmit the personal data 30 to the backend server 1.

The backend server 1 further authenticates the users 3a, 3b, 3c of the vehicles 2a, 2b, 2c by means of vehicle-related data 20 provided and transmitted by the vehicle 2a, 2b, 2c or by means of equipment-related data 40 provided and transmitted by equipment 4a, 4b, 4c, 4d.

The backend server 1 authenticates each user 3a, 3b, 3c by means of vehicle identifiers 200, vehicle coordinates 201 and/or driving behavior data 202 of the vehicles 2a, 2b, 2c as the vehicle-related data 20 and/or by means of access data 300, biometric data 301 or device usage data 302 of the users 3a, 3b, 3c as the personal data 30.

Each vehicle 2a, 2b, 2c advantageously transmits the personal data 30 and the vehicle-related data 20 to the backend server 1 in an event-controlled manner, immediately or with a time delay after local buffering.

Each vehicle 2a, 2b, 2c can also transmit the personal data 30 and the vehicle-related data 20 to the backend server 1 in encrypted and/or compressed form.

Each user 3a, 3b, 3c can approve or prohibit the transmission of the personal data 30 or the vehicle-related data 20 or the creation of the block 70.

Figure 4:
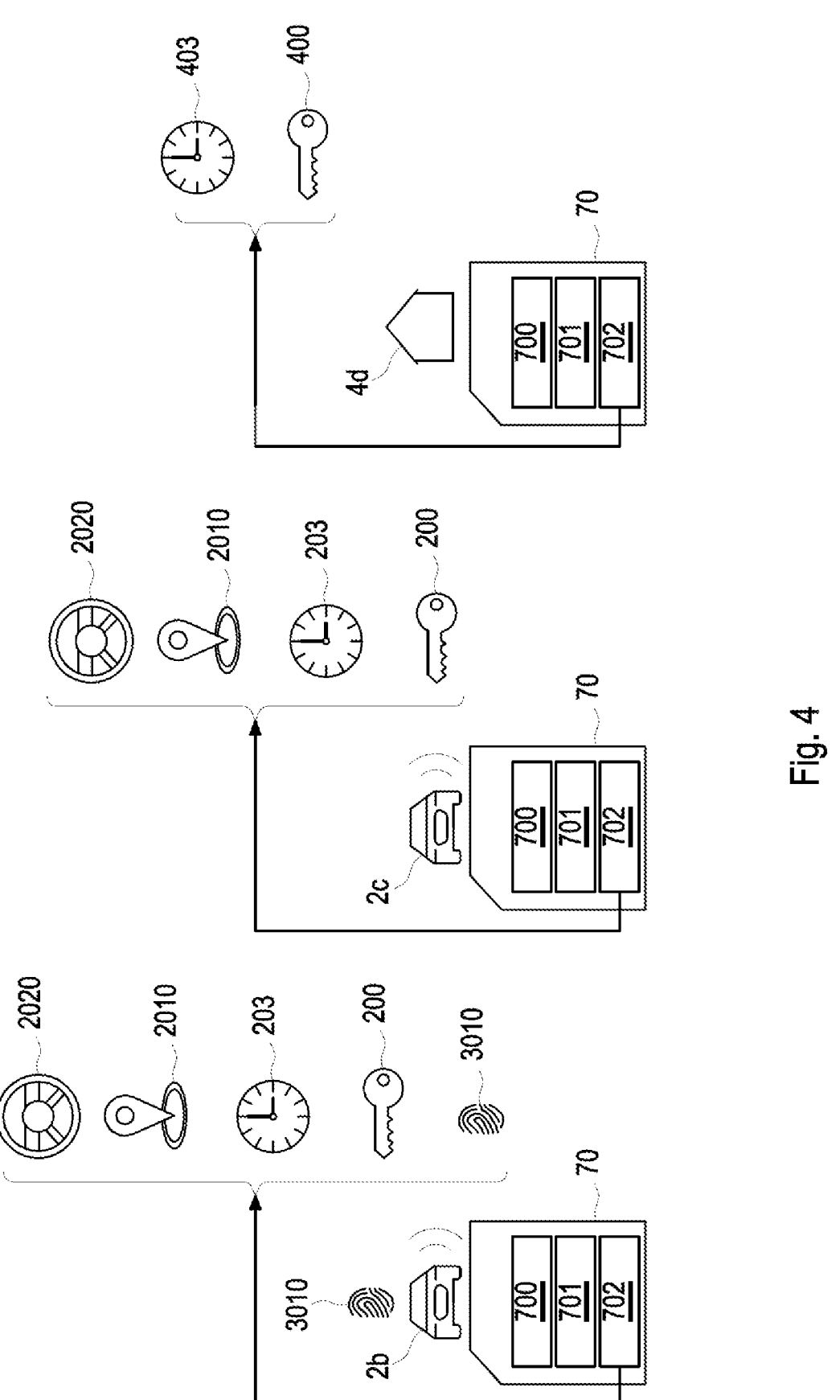
FIG. 4 shows blocks of the blockchain assigned to the vehicle 2a shown in FIG. 1.

The backend server 1 preferably uses the personal data 30, the vehicle-related data 20 and/or the equipment-related data 40 to create a block 70 of a blockchain 7a, 7b, 7c assigned to the user 3a, 3b, 3c and the vehicle 2a, 2b, 2c (see FIG. 4, 5).

Ideally, the created block 70 corresponds to a contact of the vehicle 2a, 2b, 2c with a contact point 5 of the vehicle 2a, 2b, 2c detected by the vehicle 2a, 2b, 2c.

In particular, stationary equipment 4a, 4b, 4c or another vehicle 2a, 2b, 2c is detected as the contact point 5.

Irrespective of an authorization or prohibition, the vehicle 2a, 2b, 2c can also be a contact point 5 for further vehicles 2a, 2b, 2c if a user 3a, 3b, 3c prohibits the transmission of the personal data 30 or the vehicle-related data 20 or the creation of the block 70.

FIG. 4 shows blocks 170 of the blockchain assigned to the vehicle 2a shown in FIG. 7a (see FIG. 5) Each block 170 comprises a hash value 702 created from information relating to a contact point 5 of the vehicle 2a, a hash value 701 of a predecessor node and a hash value 700 of the block 170 itself.

In detail, a block 170 corresponding to a contact of the vehicle 2a with the vehicle 2b is shown as a contact point 5, which comprises a steering hysteresis 2020, a vehicle position 2010, a timestamp 203, a vehicle identifier 200 of the vehicle 2a and a fingerprint 3010 of the user 3a as information of the contact.

Furthermore, a block 170 corresponding to a contact of the vehicle 2a with the vehicle 2c is shown as contact point 5, which, apart from the fingerprint 3010, comprises the same information as in the above block 170.

Also shown is a block 170 corresponding to a contact of the vehicle 2a with a residence 4d as contact point 5, which comprises only a timestamp 403 and an identifier 400 of the residence 4d as information of the contact.

Figure 5:
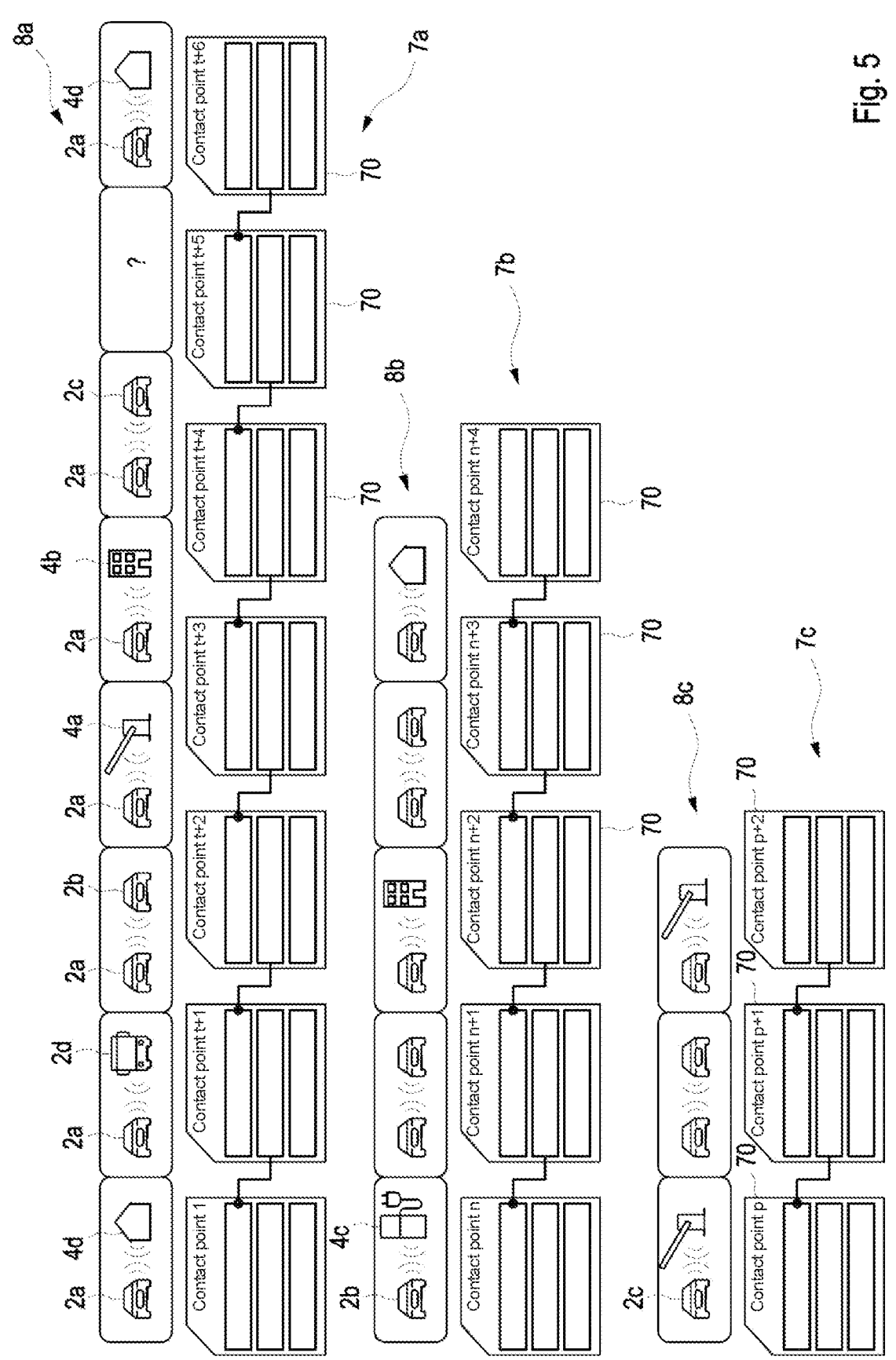
FIG. 5 shows the three vehicles shown in FIG. 1 and sections of the blockchains assigned to the three vehicles.

FIG. 5 shows the three vehicles 2a, 2b, 2c shown in FIG. 1 and sections of the blockchains 7a, 7b, 7c assigned to each of the three vehicles 2a, 2b, 2c.

The backend server 1 can verify the created block 70 by comparing the created block 70 with a plurality of stored predetermined contact points 5 or with a block 70 of a blockchain 7a, 7b, 7c of another vehicle 2a, 2b, 2c, 2d.

The authentication of the user 3a, 3b, 3c advantageously comprises a plausibility check of the transmitted personal data 30 and/or vehicle-related data 20 by means of an artificial neural network.

The invention claimed is:

1. A method, by a backend server, the method comprising:
   authenticating a user of a vehicle to an application by both personal data provided by the user and by vehicle-related data provided and transmitted by the vehicle while the vehicle is in motion;
   storing the personal data and the vehicle-related data protecting the stored data from unauthorized manipulation;
   creating, from the stored data, a block of a blockchain assigned to the user and the vehicle; and
   verifying the created block by comparing the created block with a block of a blockchain of a second vehicle, wherein authenticating the user of the vehicle involves transmission of both the personal data and the vehicle-related data being triggered by motion of the second vehicle with a predetermined minimum distance of the vehicle.

2. The method of claim 1, further comprising:
   authenticating, with the backend server, the user by vehicle identifiers, vehicle coordinates.

3. The method of claim 1, wherein the user authorizes or prohibits a transmission of the personal data or the vehicle-related data to the backend server.

4. The method of claim 1, wherein an artificial neural network, after a training phase, is configured to recognize patterns in both personal data and the vehicle-related data.

5. The method of claim 1, wherein each vehicle of a plurality of vehicles has a respective backend server.

6. The method according to claim 1, wherein the backend server is connected to a mobile radio network.

7. The method of claim 2, wherein the user authorizes or prohibits a transmission of the personal data or the vehicle-related data to the backend server.

8. The method of claim 2, wherein an artificial neural network, after a training phase, is configured to recognize patterns in both personal data and the vehicle-related data.

9. The method of claim 3, wherein an artificial neural network, after a training phase, is configured to recognize patterns in both personal data and the vehicle-related data.

10. The method of claim 1, further comprising:
   authenticating, with the backend server, the user by access data, biometric data, or device usage data of the user as the personal data.

11. The method of claim 1, wherein the user authorizes or prohibits creating, from the stored data, the block of the blockchain.

12. The method of claim 1, wherein the vehicle is configured to passively act as the contact point for other vehicles, regardless of any prohibition by the user.

13. The method of claim 2, wherein the user authorizes or prohibits creating, from the stored data, the block of the blockchain.

14. The method of claim 2, wherein the vehicle is configured to passively act as the contact point for other vehicles, regardless of any prohibition by the user.

* * * * *